`US011097317B1`

United States Patent
Oh et al.

(10) Patent No.: US 11,097,317 B1
(45) Date of Patent: Aug. 24, 2021

(54) ELECTRONIC APPARATUS AND INFORMATION PROVIDING METHOD THEREOF

(71) Applicant: Coupang Corp., Seoul (KR)

(72) Inventors: Jeong Seok Oh, Seoul (KR); Ji Young Ko, Seoul (KR); Sung Eun Kim, Seoul (KR); Sang Ho Yim, Seoul (KR); Ji Won Hwang, Seoul (KR); Woong Kim, Seoul (KR); Chang Geun Jin, Seoul (KR); In Woo Park, Seoul (KR); Seo Kyoung Leem, Seoul (KR); Eung Soo Lee, Seoul (KR); Jung Hoi Park, Seoul (KR); Lianxi Bai, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/016,165

(22) Filed: Sep. 9, 2020

(30) Foreign Application Priority Data

Aug. 6, 2020   (KR) .................. 10-2020-0098798

(51) Int. Cl.
    *G06F 7/00*     (2006.01)
    *B07C 5/34*     (2006.01)
    *G06Q 10/08*    (2012.01)
    *B65G 1/137*    (2006.01)

(52) U.S. Cl.
    CPC .......... *B07C 5/3412* (2013.01); *B65G 1/1373* (2013.01); *G06Q 10/083* (2013.01); *G06Q 10/087* (2013.01)

(58) Field of Classification Search
    None
    See application file for complete search history.

(56) References Cited

U.S. PATENT DOCUMENTS

| | | | |
|---|---|---|---|
| 7,246,706 B1* | 7/2007 | Shakes | B07C 7/02 209/614 |
| 8,952,284 B1* | 2/2015 | Wong | G05B 15/02 209/586 |
| 10,026,044 B1* | 7/2018 | Wurman | G06Q 10/047 |
| 2008/0110984 A1 | 5/2008 | Uchitani | |
| 2016/0185528 A1 | 6/2016 | Hara et al. | |
| 2020/0223635 A1* | 7/2020 | Govindaswamy | B65G 1/1378 |

FOREIGN PATENT DOCUMENTS

| | | |
|---|---|---|
| JP | 2001-019126 A | 1/2001 |
| JP | 2006-012132 A | 1/2006 |
| JP | 2011-157139 A | 8/2011 |
| JP | 2015-140228 A | 8/2015 |
| JP | 2016-057679 A | 4/2016 |
| JP | 2019-149002 A | 9/2019 |
| KR | 10-2011-0080994 A | 7/2011 |
| KR | 10-2013-0038884 A | 4/2013 |
| KR | 10-2018-0109120 A | 10/2018 |
| KR | 10-2020-0087520 A | 7/2020 |
| WO | WO 2005-110896 A1 | 11/2005 |

* cited by examiner

*Primary Examiner* — Yolanda R Cumbess
(74) *Attorney, Agent, or Firm* — Knobbe, Martens, Olson & Bear, LLP

(57) ABSTRACT

Provided is an information providing method of an electronic apparatus. The information providing method includes identifying an operation target set including a plurality of operation cells, identifying at least one operation cell for which item sorting is completed among the plurality of operation cells included in the operation target set, and displaying information on or regarding an operation cell selected based on priority order information from among the identified at least one operation cell.

13 Claims, 15 Drawing Sheets

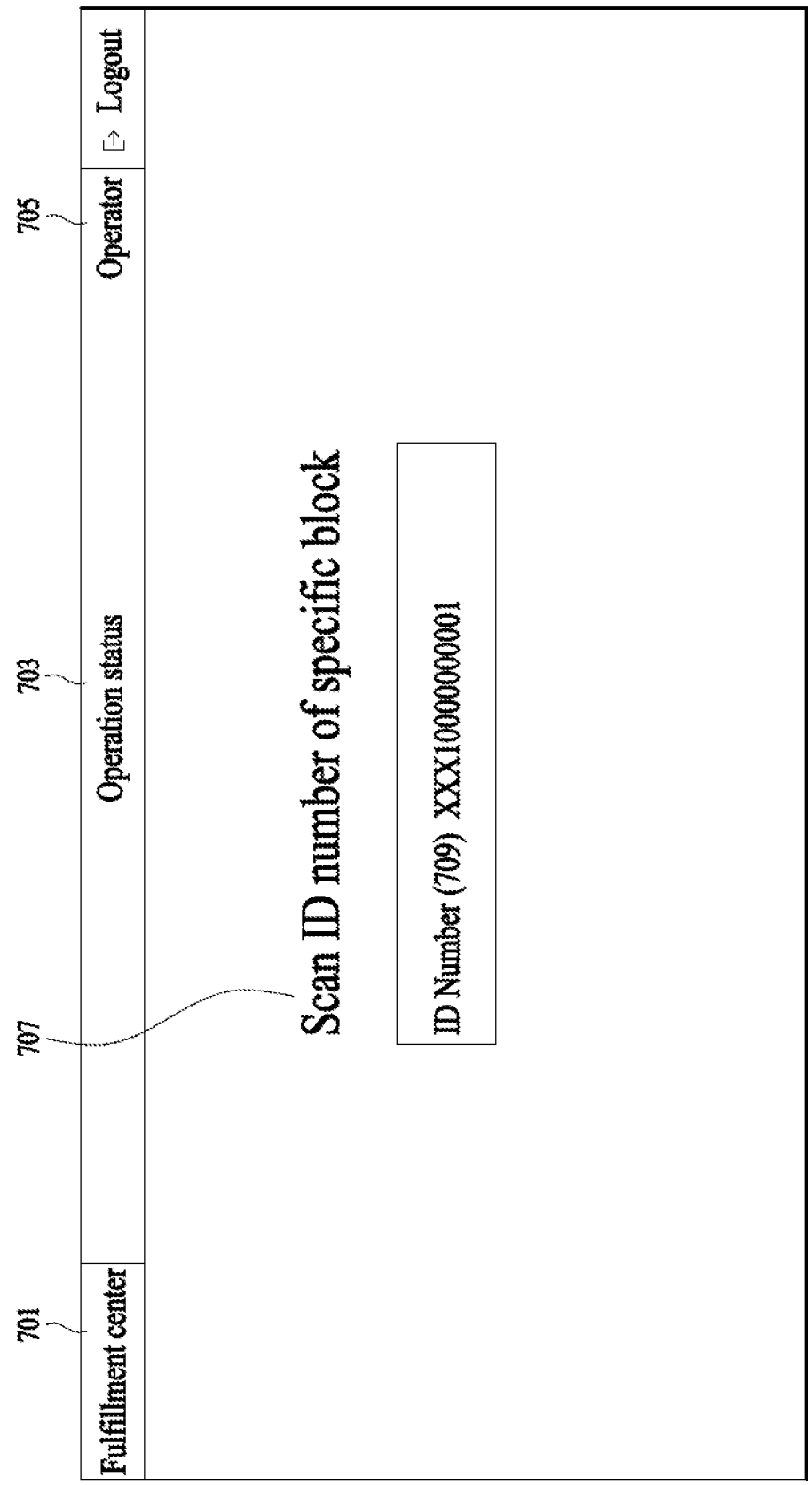

ELECTRONIC APPARATUS AND INFORMATION PROVIDING METHOD THEREOF

BACKGROUND

Technical Field

The present disclosure relates to an electronic apparatus for providing associated information to an operator and an information providing method thereof.

Description of the Related Art

Hundreds of thousands of items on average are being delivered every day, and it is becoming a key for an item delivery service to deliver an ordered item to a customer quickly and accurately. In addition, if a fresh item is ordered, it is becoming more important to make a delivery quickly to a customer while maintaining the item fresh. Accordingly, there is a need for a technology for providing associated information to an operator in a fulfillment center, so that the freshness of the item can be maintained by reducing a lead time while delivering the item to the customer at an accurate time.

SUMMARY

Technical Goals

The disclosed embodiments are intended to disclose an electronic apparatus and an information providing method thereof. Technical goals of the present disclosure are not limited to the above-mentioned goal, and other goals and advantages of the present disclosure which are not mentioned herein could be understood by the following embodiments.

Technical Solutions

According to a first embodiment, there is provided an information providing method of an electronic apparatus, the method including identifying an operation target set including a plurality of operation cells, identifying at least one operation cell for which item sorting is completed among the plurality of operation cells included in the operation target set, and displaying information on or regarding an operation cell selected based on priority order information from among the identified at least one operation cell.

According to the embodiment, the identifying of the at least one operation cell for which item sorting is completed may include, based on a completion input from a sorting operator for the operation cell, identifying the at least one operation cell for which item sorting is completed, and, in response to the completion input, providing information on the at least one operation cell for which item sorting is completed.

According to the embodiment, the priority order information may be identified based on a scheduled shipment date corresponding to each of the identified at least one operation cell.

According to the embodiment, a number of the selected operation cell may be identified based on a number of packing operators assigned for the operation target set.

According to the embodiment, the priority order information may be identified based on a time when item sorting is completed for each of the at least one operation cell.

According to the embodiment, the priority order information may be identified based on a number of items included in each of the at least one operation cell.

According to the embodiment, the priority order information may be identified based on a scheduled shipment date corresponding to each of the identified at least one operation cell, and when the shipment date is identical to each other, the priority order information may be identified based on a time when item sorting for each of the at least one operation cell is completed, and when the time when item sorting for each of the at least one operation cell is completed is identical to each other, the priority order information may be identified based on a number of items sorted to each of the at least one operation cell.

According to the embodiment, the method may further include identifying packing completion information, and updating the displayed information based on the completion information.

According to the embodiment, the method may further include displaying image information for identifying a different operation target set, changing an operation target set based on identification information identified by a barcode scanner in response to an input corresponding to the image information, and displaying information associated with the changed operation target set.

According to the embodiment, the method may further include identifying packing completion information for the at least one operation cell for which the item sorting is completed, and, based on the completion information, identifying the operation cell for which the item sorting is completed as an operation cell corresponding to different delivery information.

According to the embodiment, at least one item sorted to one operation cell among the plurality of operation cells may have identical delivery information.

According to a second embodiment, there is provided an electronic apparatus, including a communication device, a display configured to display information associated with an operation cell, and a controller configured to identify an operation target set including a plurality of operation cells, identify at least one operation cell for which item sorting is completed among the plurality of operation cells included in the operation target set, and select an operation cell based on priority order information among the identified at least one operation cell.

According to a third embodiment, there is provided a non-transitory recording medium readable by a computer, which stores a program for causing the computer to execute the above-described method.

Details of other embodiments are included in the detailed description and drawings.

Effects

According to the present disclosure, an electronic apparatus may check operation cells for which item sorting is completed among operation cells included in an operation target set, and may select an operation cell based on information on operation cells selected based on priority order information from among the operation cells for which item sorting is completed. Accordingly, a packing operator first performs an operation on the operation cell selected based on the priority order information, so that the lead time can be reduced and the item can be delivered to the customer at an accurate time. Accordingly, it is possible to more accurately and efficiently manage operations to be performed in the fulfillment center. In addition, in an embodiment, as information on operation cells requiring rapid packing among operation cells for which item sorting is completed is provided to the packing operator, packing is performed in an order arbitrarily selected by the packing operator at a packing stage and thus it is possible to prevent the packing from prolonging and also to preferentially pack and deliver an item having a higher priority so that an item with an imminent scheduled shipping time is packed first, preventing a delivery delay.

Effects are not limited to the aforementioned effects, and other effects not mentioned will be clearly understood by those skilled in the art from the description of the claims.

BRIEF DESCRIPTION OF THE DRAWINGS

FIGS. 7A to 7H illustrate screens displayed on a terminal associated with a packing operator according to an embodiment.

DETAILED DESCRIPTION

The terms used in the embodiments have selected general terms that are currently widely used as possible while taking functions in the present disclosure into consideration, but this may vary according to the intention or precedent of a technician operating in the art, the emergence of new technologies, and the like. In addition, in certain cases, there are terms arbitrarily selected by the applicant, and in this case, the meaning will be described in detail in the corresponding description. Therefore, the terms used in the present disclosure should be defined based on the meaning of the term and the contents of the present disclosure, not the name of a simple term.

When a part of the specification is said to "include" a certain element, it means that other elements may be further included instead of excluding other elements unless otherwise stated. In addition, terms such as "~ unit" and "~ module" described in the specification mean units that process at least one function or operation, which may be implemented as hardware or software, or as a combination of hardware and software.

Throughout the specification, the expression of "at least one of a, b, and c" may include "a only," "b only," "c only," "a and b," "a and c," "b and c," or "all of a, b, and c".

The "terminal" mentioned below may be implemented as a computer or portable terminal that can access a server or other terminal through a network. Here, the computer includes, for example, a notebook equipped with a web browser, a desktop, a laptop, and the like, and the portable terminal is, for example, a wireless communication device that guarantees portability and mobility, International Mobile Telecommunication (IMT), Code Division Multiple Access (CDMA), W-Code Division Multiple Access (W-CDMA), and all kinds of communication-based terminals such as LTE (Long Term Evolution), smartphones, tablet PCs, etc. It may include a handheld-based wireless communication device.

Hereinafter, exemplary embodiments of the present disclosure will be described in detail with reference to the accompanying drawings so that those of ordinary skill in the art may easily implement the present disclosure. However, the present disclosure may be implemented in various different forms and is not limited to the exemplary embodiments described herein.

Hereinafter, exemplary embodiments of the present disclosure will be described in detail with reference to the drawings.

Figure 1:
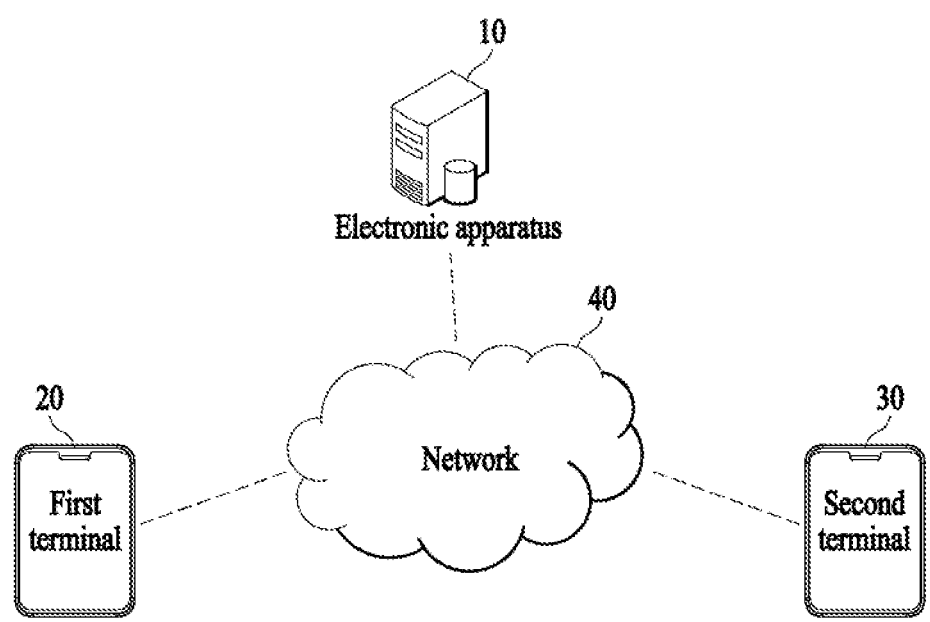
FIG. 1 illustrates a system according to an embodiment.

FIG. 1 illustrates a system according to an embodiment.

Referring to FIG. 1, the system may include an electronic apparatus 10, a first terminal 20, a second terminal 30, and a network 40. In a delivery system shown in FIG. 1, only elements related to the present embodiment are shown. Accordingly, it would be understood by one of ordinary skill in the art that general-purpose elements other than the elements shown in FIG. 1 may be further included.

The electronic apparatus 10, the first terminal 20, and the second terminal 30 may communicate with each other within the network 40. The network 40 may include a Local Area Network (LAN), a Wide Area Network (WAN), a Value Added Network (VAN), a mobile radio communication network, a satellite communication network, and a combination thereof, and the network is, in a broad sense, a data network via which components of each network illustrated in FIG. 1 actively communicate with each other and may include wired Internet, wireless Internet, and a mobile wireless communication network. Wireless communication may include, for example, but not limited to, wireless LAN (Wi-Fi), Bluetooth, Bluetooth low energy (Bluetooth low energy), Zigbee, WFD (Wi-Fi Direct), UWB (ultra wideband), infrared communication (IrDA, infrared data association)), NFC (Near Field Communication), and the like.

The electronic apparatus 10 may provide information related to delivery of an item (sometimes referred to as "item delivery-related information" herein), and may be included in a server that provides the information related to delivery of the item. The electronic apparatus 10 may provide an application for providing the foregoing information to the first terminal 20 and the second terminal 30.

The first terminal 20 may be a terminal used by a sorting operator, and the second terminal 30 may be a terminal used by a packing operator. The sorting operator may sort delivery addresses of items in units of operation cells using the information provided through the first terminal 20, and the packing operator may perform shipment verification and packing on items included in an operation cell using the information provided through the second terminal 30. Specific information provided by the first terminal 20 and the second terminal 30 will be described in detail below in other drawings. An operation target set includes a plurality of operation cells, and items included in each operation cell may be delivered to a buyer using the same delivery information.

In an example, order information corresponding to a specific order may include information related to an item included in the order. In an embodiment, an operation cell may be assigned so that an item included in a specific order can be sorted and located, the sorting operator may place an item corresponding to order information at the cell, and when all items corresponding the order information is located at the cell, the sorting operator may provide sorting completion information to a packing operator in a preset notifying method. Based on this, the packing operator may perform packing on the items located in the cell, and when the packing is completed, the packing operator may provide packing completion information for the corresponding cell to the sorting operator in a preset notifying method and even to a management system. The management system may update the setting information so that an item corresponding to different order information can be sorted and located in the cell for which the packing is completed, and the updated information may be provided to the sorting operator.

Hereinafter, specific processes performed by the electronic apparatus 10, the first terminal 20, and the second terminal 30 in regard to providing information will be described.

Figure 2:
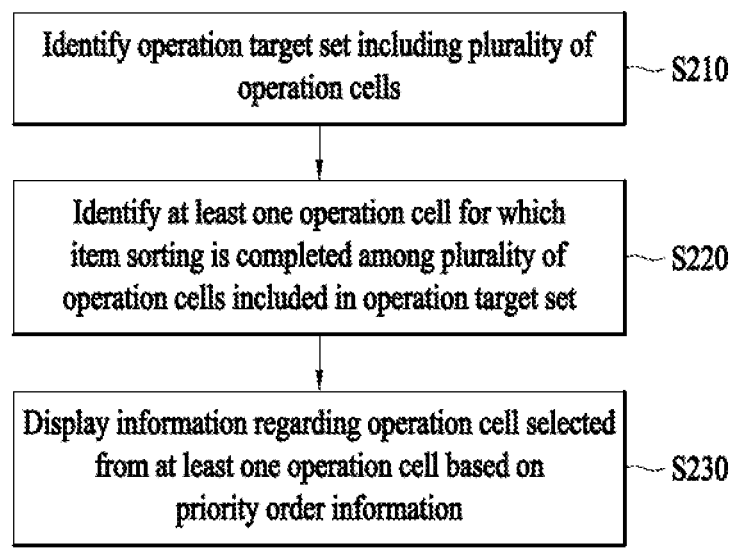
FIG. 2 illustrates an example of a method of providing information to a packing operator according to an embodiment.

FIG. 2 illustrates an example of a method of providing information to a packing operator according to an embodiment.

Referring to FIG. 2, in operation S210, an electronic apparatus may identify an operation target set including a plurality of operation cells. The operation target set includes a plurality of operation cells, and each operation cell may include items to be delivered based on the same delivery information. For example, the operation target set can include Operation Cell 1, Operation Cell 2, . . . , and Operation Cell N (for example, any of Operation Cells A01 601 . . . A05 609, C01 611 . . . C07 613, or E01 621 . . . E10 623 shown in FIG. 6), and an item included in Operation Cell 1 (for example, Operation Cell A01 601 shown in FIG. 6) may be delivered to Delivery Address 1, an item include in Operation Cell 2 (for example, Operation Cell C01 611 shown in FIG. 6) may be delivered to Delivery Address 2, and an item included in Operation Cell N (for example, Operation Cell E01 621 shown in FIG. 6) may be delivered to Delivery Address N. The operation target set has a unique identification number, and when the identification number is recognized by a barcode scanner, the operation target set may be recognized as a target set to process. For example, there are Identification Number 1 corresponding to Operation Target Set 1, Identification Number 2 corresponding to Operation Target Set 2, . . . , and Identification Number N corresponding to Operation Target Set N, and when Identification Number 2 is recognized by a barcode scanner, the electronic apparatus may recognize Operation Target Set 2 as a target set to process. The operation target sets and operation cells will be described in detail with respect to FIG. 6 below.

In operation S220, the electronic apparatus may identify at least one operation cell for which item sorting is completed among a plurality of operation cells included in the operation target set. Based on the delivery information, the sorting operator may sort items to corresponding operation cells. When the sorting operator completes sorting for the operation cells, the sorting operator may identify, based on a completion input, the operation cells for which item sorting is completed. According to the completion input, information on or regarding an operation cell for which the item sorting is completed may be displayed. Specifically, the packing operator may identify a visual indication of an operation cell for which item sorting is completed, and the packing operator may perform shipment verification and packing on the corresponding operation cell. For example, when an operator completes item sorting for an operation cell, information corresponding to the cell may be provided to the packing operator. Such information may be provided to the packing operator through an electronic apparatus or a physical device. Based on such information, the packing operator may perform packing with respect to the cell for which item sorting is completed.

In addition, in an embodiment, a method of providing information indicating a cell for which sorting is completed and a method of providing information indicating a priority order in a corresponding operation target set may be different from each other. For example, a cell for which sorting is completed may be visually displayed at a spot where the operation target set is located, and information indicating a cell having a high priority in relation to packing may be provided through a terminal of the packing operator.

In operation S230, the electronic apparatus may display information on an operation cell selected based on priority order information from among at least one operation cell. The electronic apparatus may select an operation cell based on the priority order information from among operation cells for which sorting is completed, and the second terminal may display information on the selected operation cell to the packing operator. For example, Operation Cell 1, Operation Cell 5, and Operation Cell 2 may be selected based on priority order information from among Operation Cells 1 to 7 for which sorting is completed, and the second terminal may display, for the packing operator, information on operation cells in a sequence of Operation Celli, Operation Cell 5, and Operation Cell 2. Accordingly, the packing operator may perform in a priority order an operation on operation cells recommended by the electronic apparatus.

Here, the priority order information may be identified based on a scheduled shipment date corresponding to each of the at least one operation cell. For example, in a case where, among Operation Cells 1 to 7 for which sorting is completed, Operation Cell 1 has a scheduled shipment date of Jul. 31, 2020, Operation Cell 2 has scheduled shipment date of Aug. 2, 2020, Operation Cell 3 has a scheduled shipment date of Aug. 10, 2020, Operation Cell 4 has a scheduled shipment date of Aug. 7, 2020, Operation Cell 5 has a scheduled shipment date of Aug. 1, 2020, Operation Cell 6 has a scheduled shipment date of Aug. 9, 2020, and Operation Cell 7 has a scheduled shipment date of Aug. 11, 2020, the electronic apparatus may select Operation Cell 1, Operation Cell 5, and Operation Cell 2 in order of the scheduled shipment dates thereof. That is, the electronic apparatus may determine a priority sequence according to an order in which the scheduled shipment dates are imminent, and may select operation cells according to the priority sequence. For this reason, the packing operator does not arbitrarily perform shipment verification and packing on an operation cell, but performs the shipment verification and packing on an operation cell selected based on a scheduled shipment date, so that an item can be shipped without elapse of the scheduled shipment date.

In addition, the priority order information may be identified based on a time when item sorting is completed on each of the at least one operation cell. For example, in a case where a current time is 23:00, if the sorting for Operation Cell 1 is completed at 10:00, the sorting for Operation Cell 2 is completed at 11:30, and the sorting for Operation Cell 3 is completed at 12:00, the sorting for Operation Cell 4 is completed at 13:00, the sorting for Operation Cell 5 is completed at 10:30, the sorting for Operation Cell 6 is completed at 14:30, and the sorting for Operation Cell 7 is completed at 15:20, the electronic apparatus may select Operation Cell 1, Operation Cell 5, and Operation Cell 2 in the order in which the sorting is completed. That is, the electronic apparatus may determine the priority order according to the order of when the sorting is completed, and may select an operation cell according to the priority order. Accordingly, as for a fresh item, a time to be exposed to room temperature may be reduced, and a lead time may be shortened.

Further, the priority order information may be identified based on a number of items included in each of the at least one operation cell. For example, in the case where ten items are included in Operation Cell 1, seven items are included in Operation Cell 2, five items are included in Operation Cell 3, three items are included in Operation Cell 4, eight items are included in Operation Cell 5, two items are included in Operation Cell 6, and one item is included in Operation Cell 7, the electronic apparatus may select Operation Cell 1, Operation Cell 5, and Operation Cell 2 based on a number of items. This is because when a large number of items is included in an operation cell, it takes a relatively long time to perform shipment verification and packing, and also because it aims to make a delivery first to a customer who placed a tall order.

A number of operation cells selected by the electronic apparatus may be determined based on a number of packing operators assigned to an operation target set. For example, if three packing operators are assigned to Operation Target Set 1, the electronic apparatus may select three operation cells based on priority order information and display associated information. For another example, when five packing operators are assigned to Operation Target Set 3, the electronic apparatus may select five operation cells based on priority order information and display associated information. Accordingly, the packing operators may process shipment verification and packing on the selected operation cells, respectively.

A packing operator may perform shipment verification and packing based on information associated with an operation cell displayed on the second terminal. When the packing operator completes the shipment verification and packing, the second terminal may receive completion information from the packing operator, and the electronic apparatus may identify the completion information. The electronic apparatus may update the displayed information in real time based on the completion information for the corresponding operation cell. For example, when Operation Cell 1, Operation Cell 5, and Operation Cell 2 are recommended in a priority order and the packing operator completes shipment verification and packing on Operation Cell 1, the second terminal may receive completion information from the packing operator. The electronic apparatus may display information associated with Operation Cell 4 in addition to Operation Cell 5 and Operation Cell 2, by updating the recommended operation cells in real time based on the completion information for Operation Cell 1. In this case, items included in Operation Cell 1 may be delivered to Customer 1 after shipment verification and packing are completed. Operation Cell 1 for which the shipment verification and packing are completed may be set as an operation cell corresponding to other delivery information. Specifically, when the completion information for Operation Cell 1 included in an operation target set is identified, Operation Cell 1 may now be reassigned as an operation cell corresponding to Customer 2 different from Customer 1, and item sorting/shipment verification/packing may be performed for items associated with Customer 2.

According to an embodiment, when there is no operation cell subject to the shipment verification and packing in the operation target set, image information for identifying a different operation target set may be displayed. Accordingly, the operation target set may be changed based on identification information recognized by a barcode scanner in response to an input corresponding to image information, and information associated with the changed operation target set may be displayed. For example, when shipment verification and packing on an operation cell included in Operation Target Set 1 are completed, image information for identifying a different operation target set may be displayed. When identification information for Operation Target Set 2 is recognized by the barcode scanner, Operation Target Set 1 may be changed to Operation Target Set 2, and information associated with Operation Target Set 2 may be displayed.

Alternatively, when an emergency situation is identified due to a large throughput in relation to a different operation target set, the electronic apparatus may change from a current operation target set to the different operation target set and select an operation cell based on priority order information, and the packing operator may perform shipment verification and packing on the selected operation cell. For example, when an emergency situation is identified due to a large throughput in relation to Operation Target Set 2, the electronic apparatus may change from operation target set 1 to Operation Target Set 2 and select an operation cell based on priority order information. The packing operator may perform shipment verification and packing on an operation cell selected from Operation Target Set 2. Accordingly, an operation progress may be smoothly processed.

Alternatively, the sorting operator or packing operator may change to a different operation target set based on identification information recognized by a barcode scanner, and the electronic apparatus may provide information associated with the changed operation target set.

Figure 3:
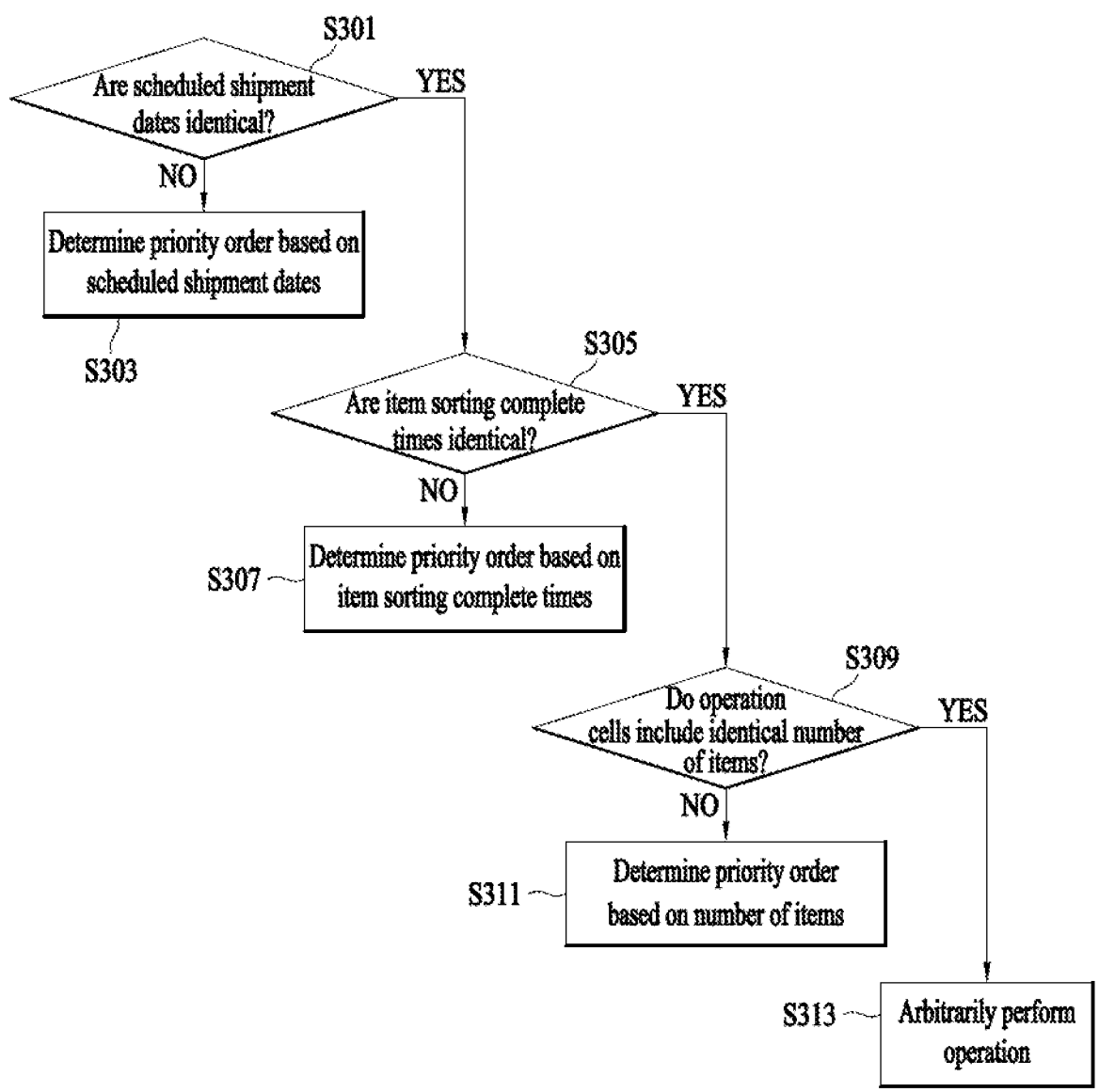
FIG. 3 illustrates an embodiment of determining a priority order in relation to packing.

FIG. 3 illustrates an embodiment of determining a priority order in relation to packing.

The electronic apparatus may select an operation cell from among Operation Cells 1 to 7 included in Operation Target Set 1 based on priority order information. There are four packing operators, and the electronic apparatus may recommend four operation cells based on priority order information.

As for Operation Cell 1, a scheduled shipment date may be Aug. 1, 2020, a sorting complete time may be 10:00, and five items may be included. As for Operation Cell 2, a scheduled shipment date may be Aug. 3, 2020, a sorting complete time may be 11:30, and seven items may be included. As for Operation Cell 3, a scheduled shipment date may be Aug. 6, 2020, a sorting complete time may be 11:30, and ten items may be included. As for Operation Cell 4, a scheduled shipment date may be Aug. 9, 2020, a sorting complete time may be 13:00, and nine items may be included. As for Operation Cell 5, a scheduled shipment date may be Aug. 3, 2020, a sorting complete time may be 10:30, and four items may be included. As for Operation Cell 6, a scheduled shipment date may be Aug. 5, 2020, a sorting complete time may be 14:00, and three items may be included. As for Operation Cell 7, a scheduled shipment date may be Aug. 3, 2020, a sorting complete time of 11:30, and ten items may be included. A current time is assumed to be 23:00.

In operation S301, the electronic apparatus may compare whether scheduled shipment dates of operation cells are identical to each other, and in operation S303, the electronic apparatus may determine a priority order based on the scheduled shipment dates that are not identical to each other.

For example, the electronic apparatus may recommend Operation Cell 1 with a highest priority based on the scheduled shipment dates.

In operation S305, when the scheduled delivery dates are identical to each other, the electronic apparatus may perform a comparison to see if the sorting is completed at an identical time, and in operation S307, the electronic apparatus may determine a priority order based on a time when the sorting is completed. For example, from among Operation Cell 2, Operation Cell 5, and Operation Cell 7 which have the identical scheduled shipment dates, the electronic apparatus may recommend Operation Cell 1 and then Operation Cell 5 in a priority order based on a time when item sorting is completed.

In operation S309, the electronic apparatus may compare whether the operation cells have the identical number of items included therein when the item sorting is completed at the identical time, and in operation S311, the electronic apparatus may determine a priority order based on the number of items. For example, from among Operation Cell 2 and Operation Cell 7 on which items sorting is completed at the identical time, the electronic apparatus may recommend Operation Cell 1, Operation Cell 5, and Operation Cell 7 in a priority order based on the number of items included in the operation cells. That is, the electronic apparatus may recommend Operation Cell 1, Operation Cell 5, Operation Cell 7, and Operation Cell 2 in order, and the packing operator may perform shipment verification and packing on the corresponding operation cells first.

If the operation cells include the identical number of items in operation S313, the packing operator may arbitrarily perform an operation on an operation cell of which a priority cannot be determined.

Figure 4:
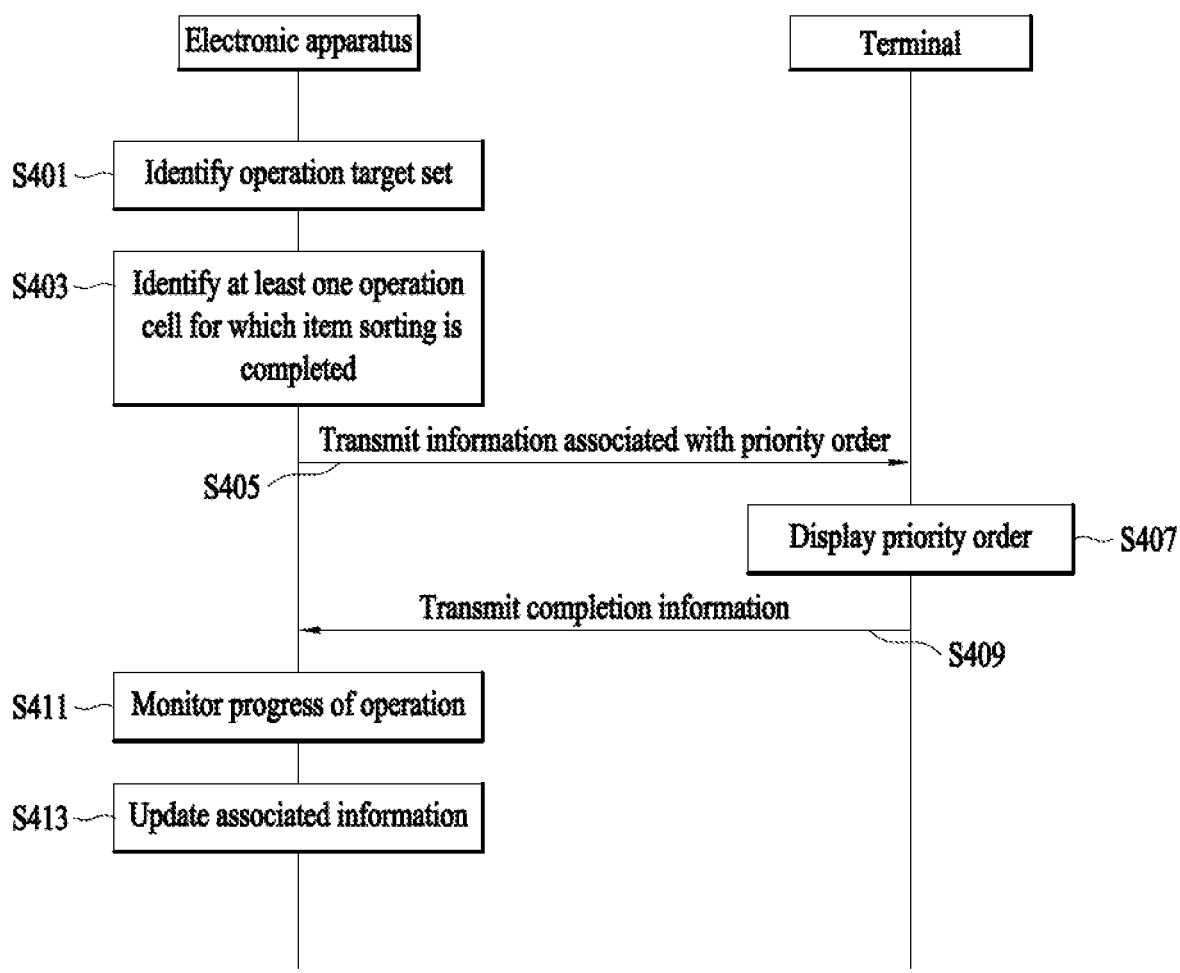
FIG. 4 illustrates an embodiment of a method of exchanging information between an electronic apparatus and a terminal to provide information to a packing operator.

FIG. 4 illustrates an embodiment of a method of exchanging information between an electronic apparatus and a terminal to provide information to a packing operator.

Referring to FIG. 4, in operation S401, the electronic apparatus may identify an operation target set. The operation target set has respective identification information, and as the identification information is recognized by a barcode scanner, the electronic apparatus may identify the operation target set. In an embodiment, an input device such as the barcode scanner may be connected to the electronic apparatus or a terminal, and accordingly, an operation target set may be identified.

In operation S403, the electronic apparatus may identify at least one operation cell for which item sorting is completed. A sorting operator may sort items in units of operation cells, and a packing operator may perform shipment verification and packing on the operation cells for which the sorting is completed. In this case, the electronic apparatus may select an operation cell based on a priority order, and the packing operator may perform shipment verification and packing on the selected operation cell.

In operation S405, the electronic apparatus may transmit information associated with the selected operation cell to the terminal based on the priority order.

In operation S407, the terminal may display a high-priority operation cell based on the received information. In this case, the terminal is a device corresponding to the packing operator, and the packing operator may perform an associated operation using the terminal. Alternatively, the electronic apparatus may display the high-priority operation cell using a display connected thereto.

In operation S409, when the packing operator completes the shipment verification and packing on the high-priority operation cell and applies an associated input to the terminal, the terminal may transmit completion information to the electronic apparatus. In operation S411, the electronic apparatus may monitor an operation progress status, and when the electronic apparatus receives completion information for the packing from the terminal, associated information may be updated in operation S413. Thereafter, the electronic apparatus may recommend a different operation cell based on the priority order.

Figure 5:
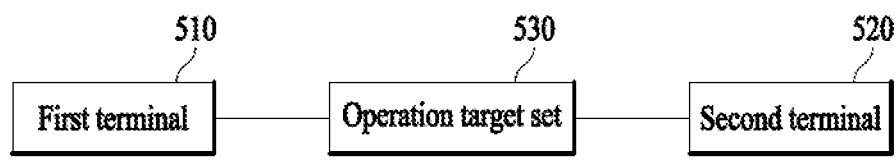
FIG. 5 illustrates arrangement of an operation target set and a terminal according to an embodiment.

FIG. 5 illustrates arrangement of an operation target set and a terminal according to an embodiment.

A first terminal 510 may be a device used by a sorting operator, and a second terminal 520 may be a device used by a packing operator. Identification information of an item may be recognized using the first terminal 510, and the item may be sorted to an operation cell included in an operation target set 530 based on the identification information. That is, the item may be assigned to the corresponding operation cell using the information displayed on the first terminal 510. For example, the identification information of Item 1 may be identified using the first terminal 510, and the first terminal 510 may display, based on the identification information, an address to which Item 1 is to be delivered. Item 1 may be assigned to Operation Cell 1 based on information displayed on the first terminal 510. In addition, identification information of Item 2 may be recognized using the first terminal 510, and the first terminal 510 may display, based on the identification information, an address to which Item 2 is to be delivered. Item 2 may be assigned to Operation Cell 1 based on information displayed on first terminal 510. Item 1 and Item 2 assigned to Operation Cell 1 may then be delivered to the same address. When an operation on Operation Cell 1 is completed, the first terminal 510 may receive a completion input from the sorting operator, and the electronic apparatus may identify the operation cell for which item sorting is completed.

The operation target set 530 may include Operation Cell 1 to operation cell N. In this case, the goods included in the operation cell for which sorting is completed may be delivered to the same address. Items included in Operation Cell 1 may be delivered to Address 1, items included in Operation Cell 2 may be delivered to Address 2, and items included in operation cell N may be delivered to Address N.

The electronic apparatus may recommend an operation cell based on a priority order, and the second terminal 520 may display associated information to the packing operator. Based on the priority order displayed on the second terminal 520, shipment verification and packing on an operation cell may be performed. Details of the shipment verification and packing will be described in FIG. 7 below.

Figure 6:
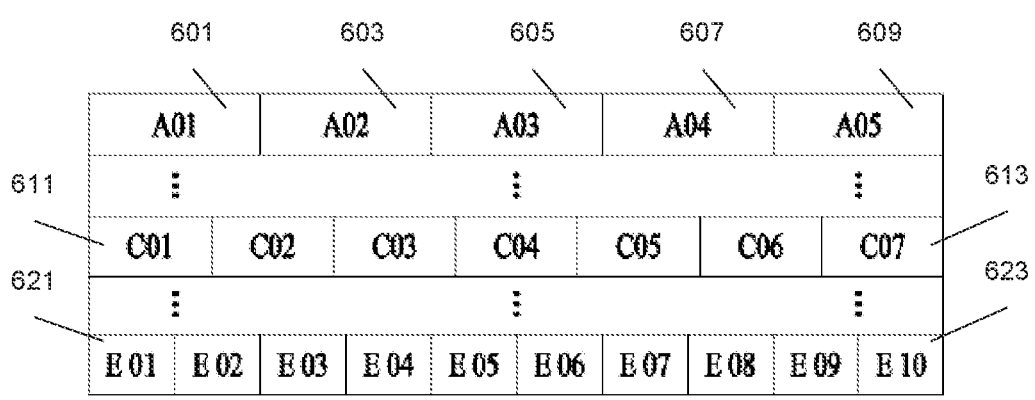
FIG. 6 illustrates arrangement of operation cells according to an embodiment.

FIG. 6 illustrates arrangement of operation cells according to an embodiment.

An operation target set may include at least one operation cell. For example, the operation target set may include Operation Cell A01 to Operation Cell A05, Operation Cell C01 to Operation Cell C07, and Operation Cell E01 to Operation Cell E10. Rows of operation cells included in the operation target set may be determined in association with delivery information. For example, Operation Cell A and Operation Cell C may be differentiated based on the delivery information.

A first terminal may display an operation cell to which an item is to be assigned using identification information and delivery information of the item, and the sorting operator may sort the item to the corresponding operation cell using the first terminal. For example, the first terminal may display Operation Cell A03 to which Item 1 is to be assigned, using identification information and delivery information of Item 1, and the sorting operator may sort the item to the corresponding Operation Cell A03 using the first terminal. For another example, the first terminal may display Operation Cell A05 to which Item 2 is to be assigned, using identification information and delivery information of Item 2, and the sorting operator may sort the item to the corresponding Operation Cell A05 using the first terminal.

The first terminal may receive, from the sorting operator, an input indicating that item sorting for the operation cells is completed, and the electronic apparatus may display, based on a priority order, at least some of the operation cells for which the item sorting is completed. For example, if item sorting for Operation Cell A01, Operation Cell A03, Operation Cell C02, Operation Cell C06, Operation Cell E04, Operation Cell E08, and Operation Cell E10 is completed, the electronic apparatus may determine a priority order in a sequence of Operation Cell A01, Operation Cell C02, Operation Cell E08, Operation Cell A03, Operation Cell E10, Operation Cell C06, and Operation Cell E04.

A second terminal may receive associated information from the electronic apparatus and display the same. Alternatively, the electronic apparatus may display the associated information using a display connected thereto. Shipment verification and packing may be performed first on Operation Cell A01 according to the priority order, and associated information may be updated when the operation on Operation Cell A01 is completed.

FIGS. 7A to 7H illustrate screens displayed on a terminal associated with a packing operator according to an embodiment.

FIG. 7A illustrates identifying a specific block within a fulfillment center. A fulfillment center may be divided into a plurality of blocks, and an associated operation may be performed in each block. An area 701 on a screen shows information associated with the fulfillment center, and, for example, a fulfillment center in XX region may be displayed. An area 703 shows an operation status related to delivery, and, for example, a shipment verification stage may be displayed. An area 705 shows information associated with a person in charge of an operation, and, for example, personal information of a person Y in charge may be displayed.

Each block located in the fulfillment center has a unique identification number, and the unique identification number, when recognized by a barcode scanner, identifies a corresponding block may be identified within the fulfillment center. For example, when identification number 709 XXX10000000001 is recognized, a block corresponding to the identification number may be identified.

Figure 7B:
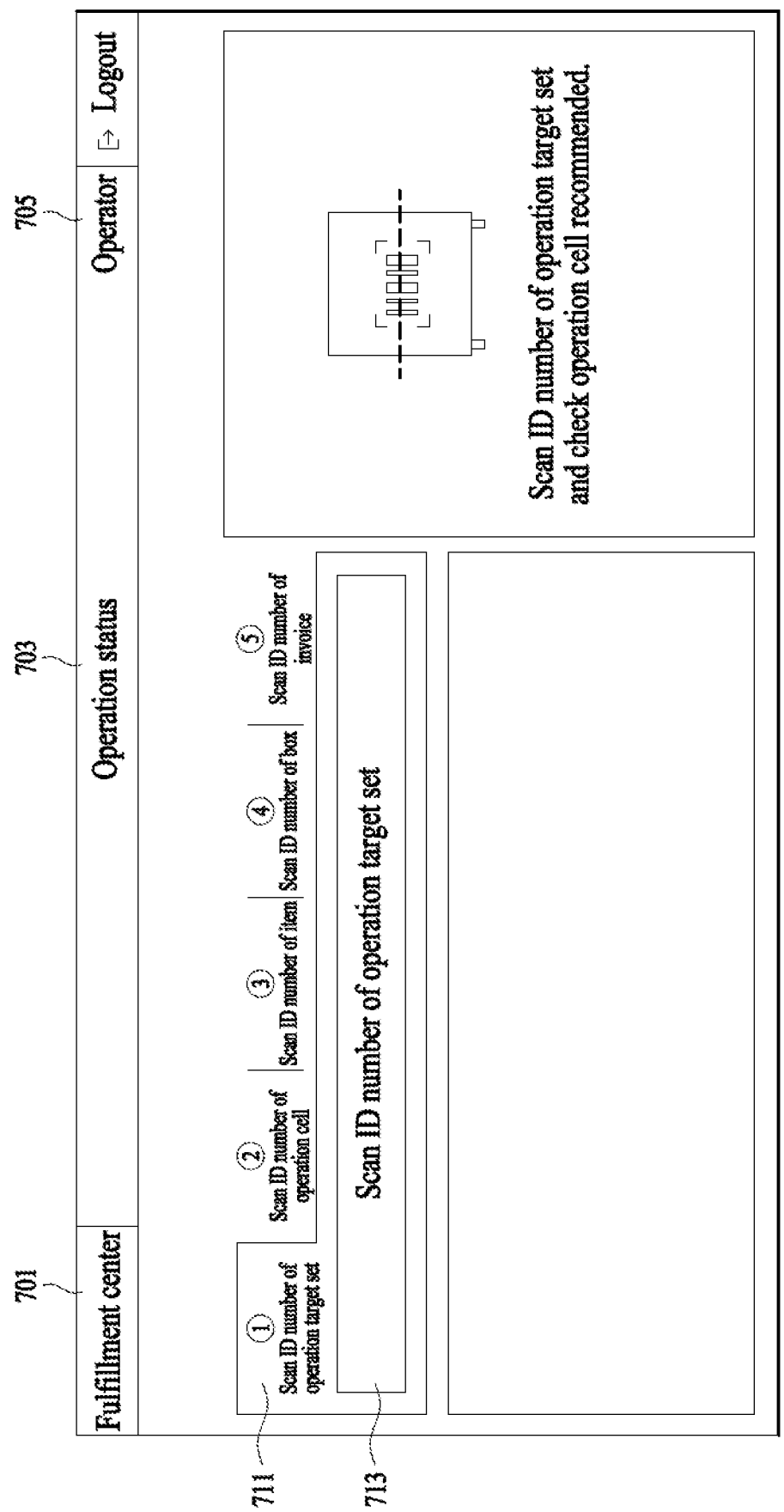

FIG. 7B illustrates identifying an operation target set. An operation target set also has a unique identification number, and the operation target set may be identified through scanning. At this time, areas 711 and 713 of the screen may be activated.

Figure 7C:
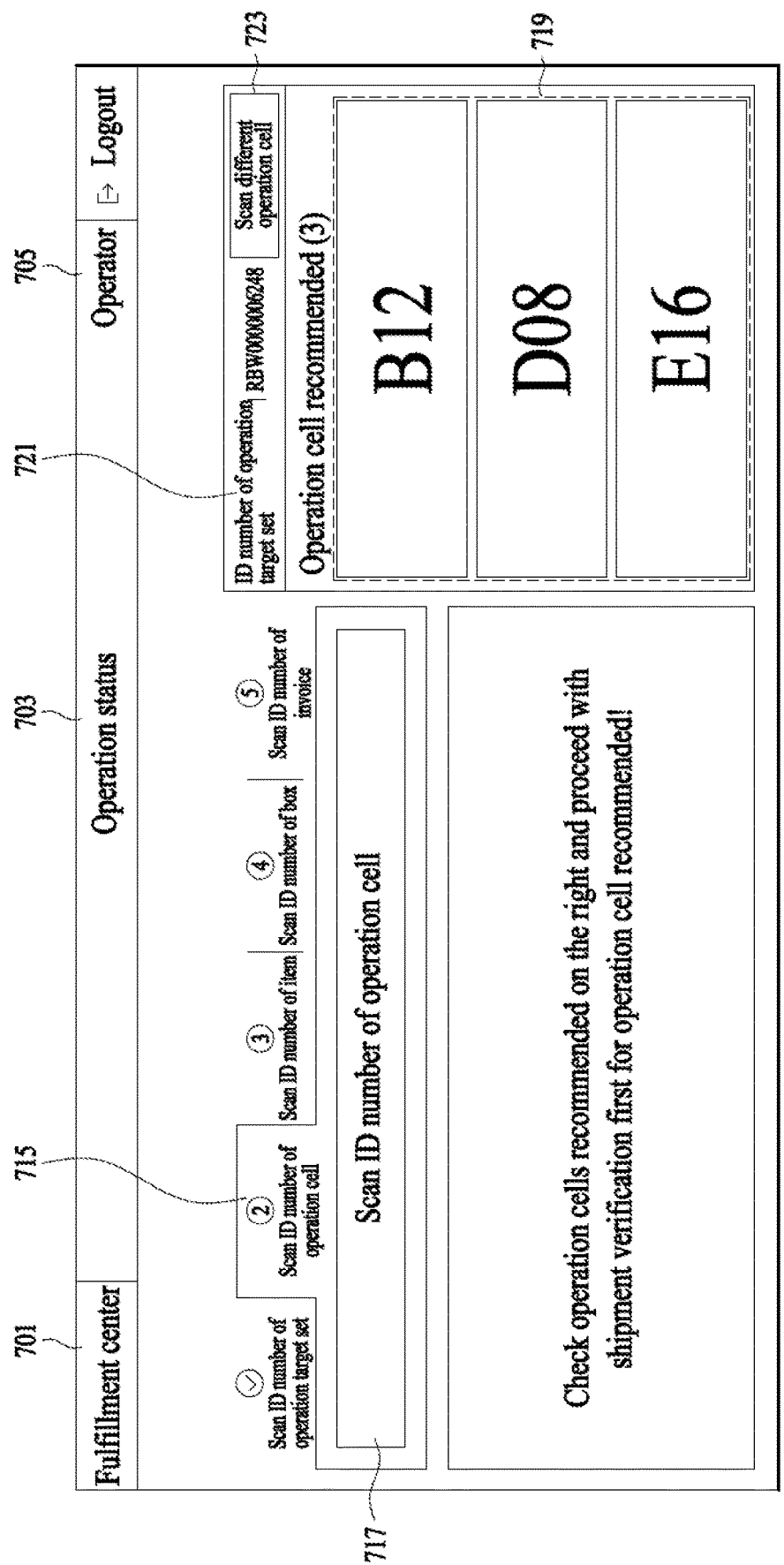

FIG. 7C illustrates identifying an operation cell. In this case, areas 715 and 717 may be activated. At this time, identification number of an operation target set 721 may be RBW0000006248. The operation target set corresponding to the identification number RBW0000006248 may include a plurality of operation cells, and the electronic apparatus may select a high-priority operation cell from operation cells for which item sorting is completed. For example, Operation Cell B12, Operation Cell D08, and Operation Cell E16 may be displayed in a priority order in an area 719 among the operation cells for which item sorting is completed, and the packing operator may perform shipment verification and packing first on the corresponding operation cells using the displayed information.

In this case, when an area 723 is selected, shipment verification and packing may be performed on an operation target set different from the operation target set corresponding to the identification number RBW0000006248.

Figure 7D:
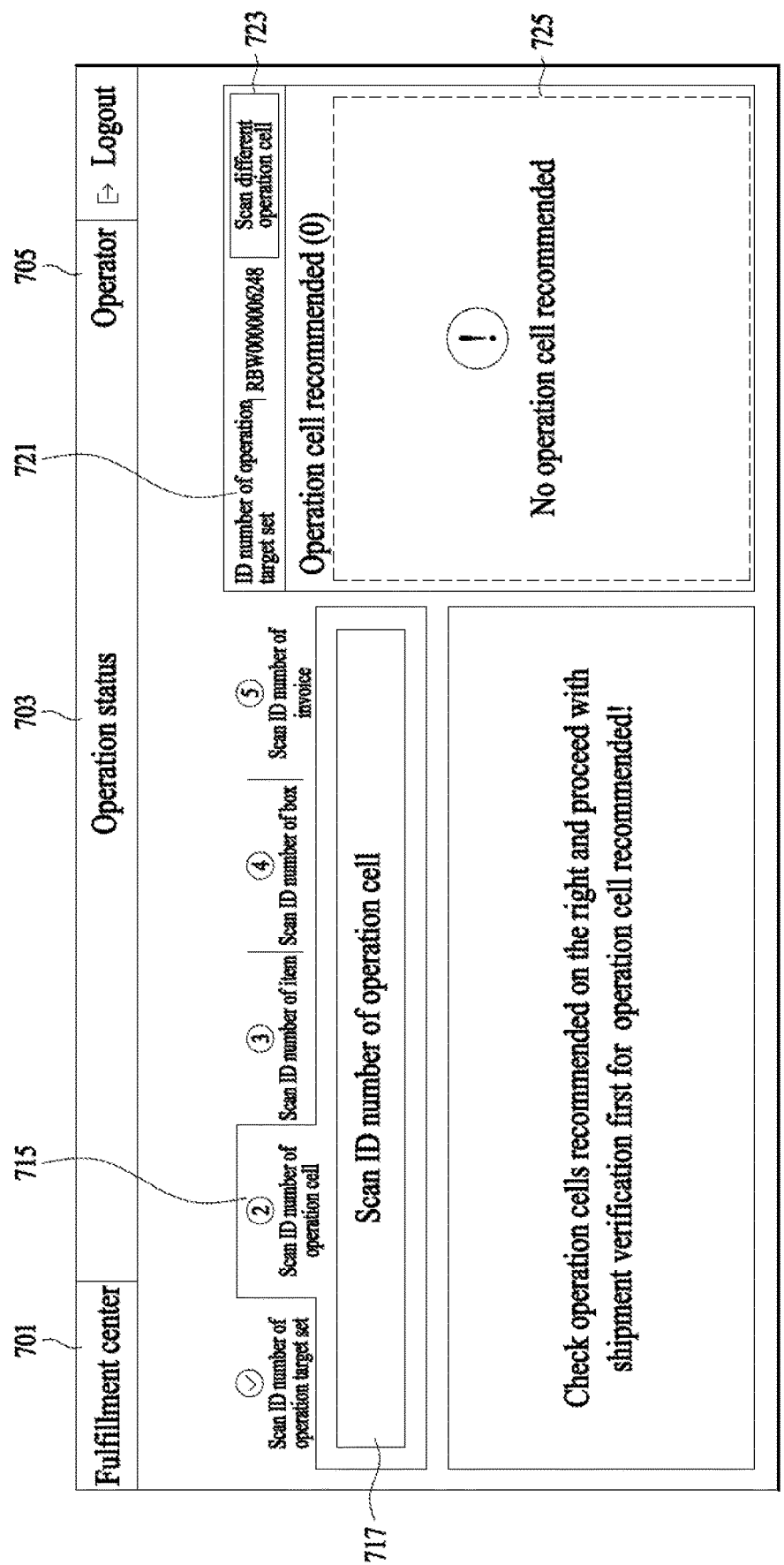

FIG. 7D illustrates a case where there is no recommended operation cell. When shipment verification and packing are performed on all operation cells included in an operation target set or when there is no operation cell for which item sorting is completed, it may be displayed as shown in an area 725.

Figure 7E:
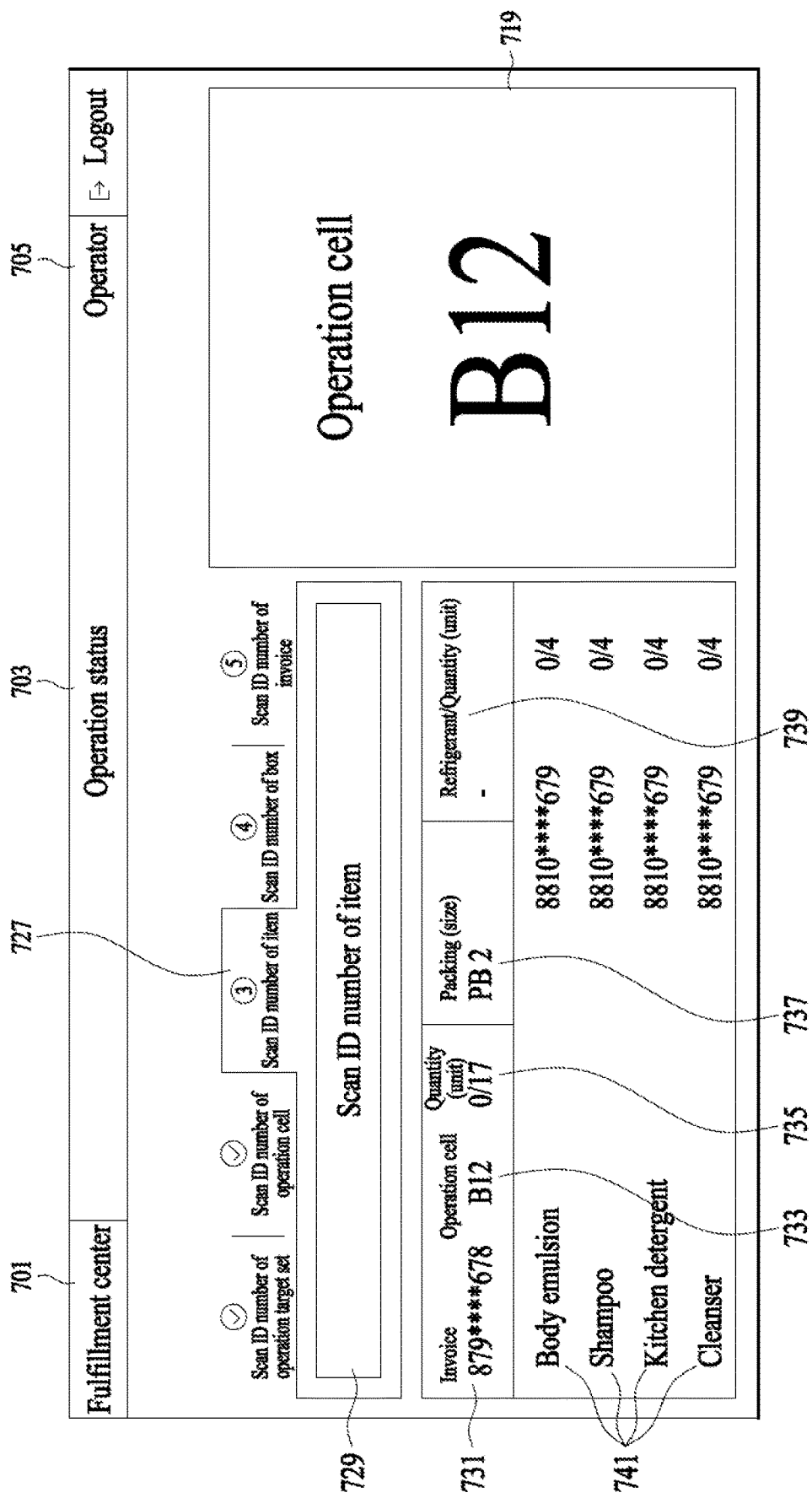
Figure 7F:
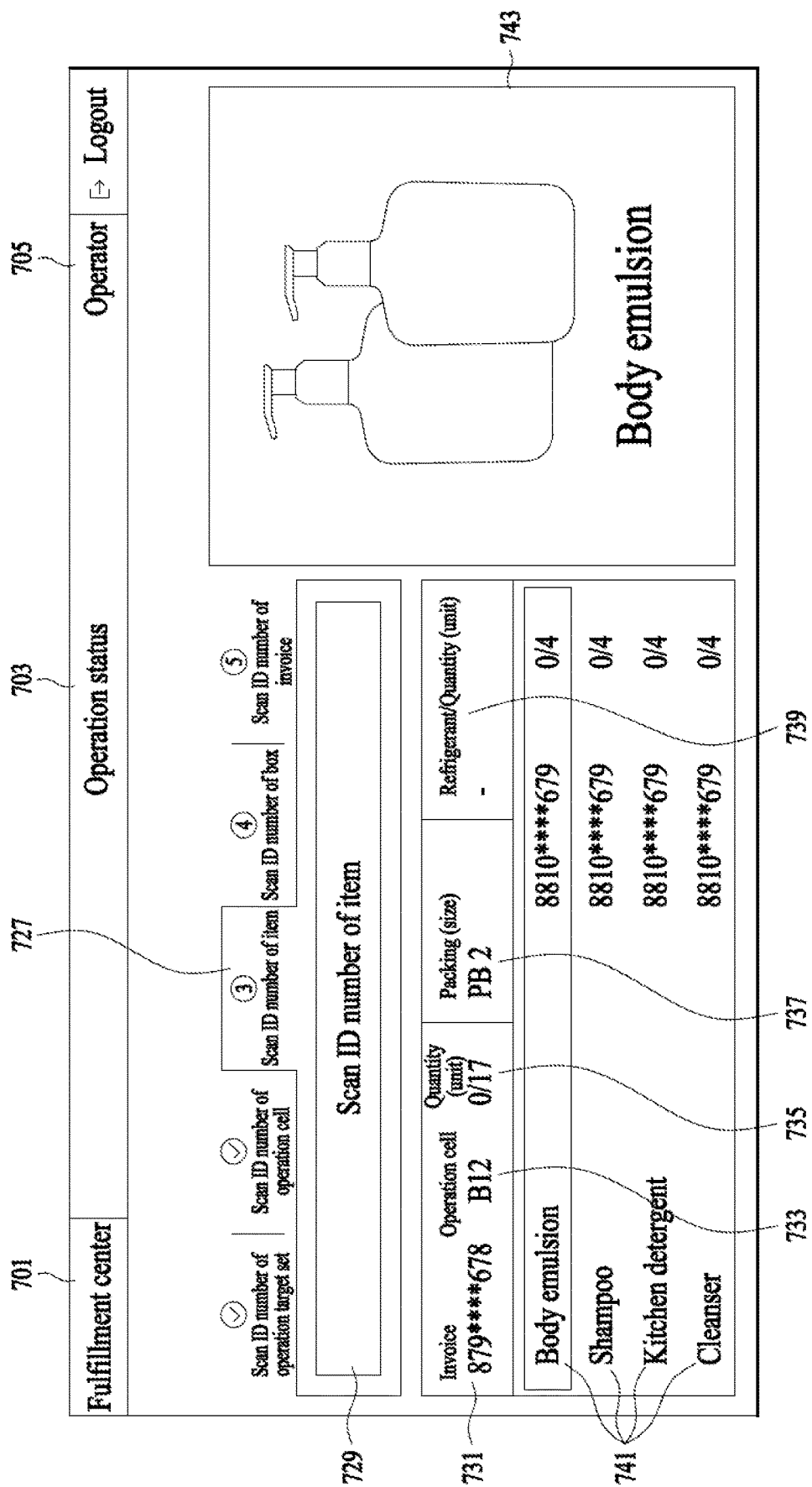

FIGS. 7E and 7F illustrate a process of verifying an item during a shipment verification process. In this case, areas 727 and 729 may be activated. An area 731 indicates an invoice number associated with Operation Cell B12, and the invoice number may be a unique number including information associated with all matters related to delivery of the item. An area 733 indicates an operation cells subject to shipment verification, an area 735 indicates a quantity, an area 737 indicates information associated with a box for packing of Operation Cell B12, and an area 739 indicates information associated with a refrigerant. When Operation Cell B12 is selected according to a priority order, an item list 741 of items included in Operation Cell B12 may be displayed. The item list 741 may indicate items ordered by a customer. Through barcode scanning, it may be identified whether the items on the item list 741 are all included in Operation Cell B12. When a barcode of an item "Neutrogena Norwegian formula body" included in the item list 741 is scanned, associated information may be displayed in an area 743.

Figure 7G:
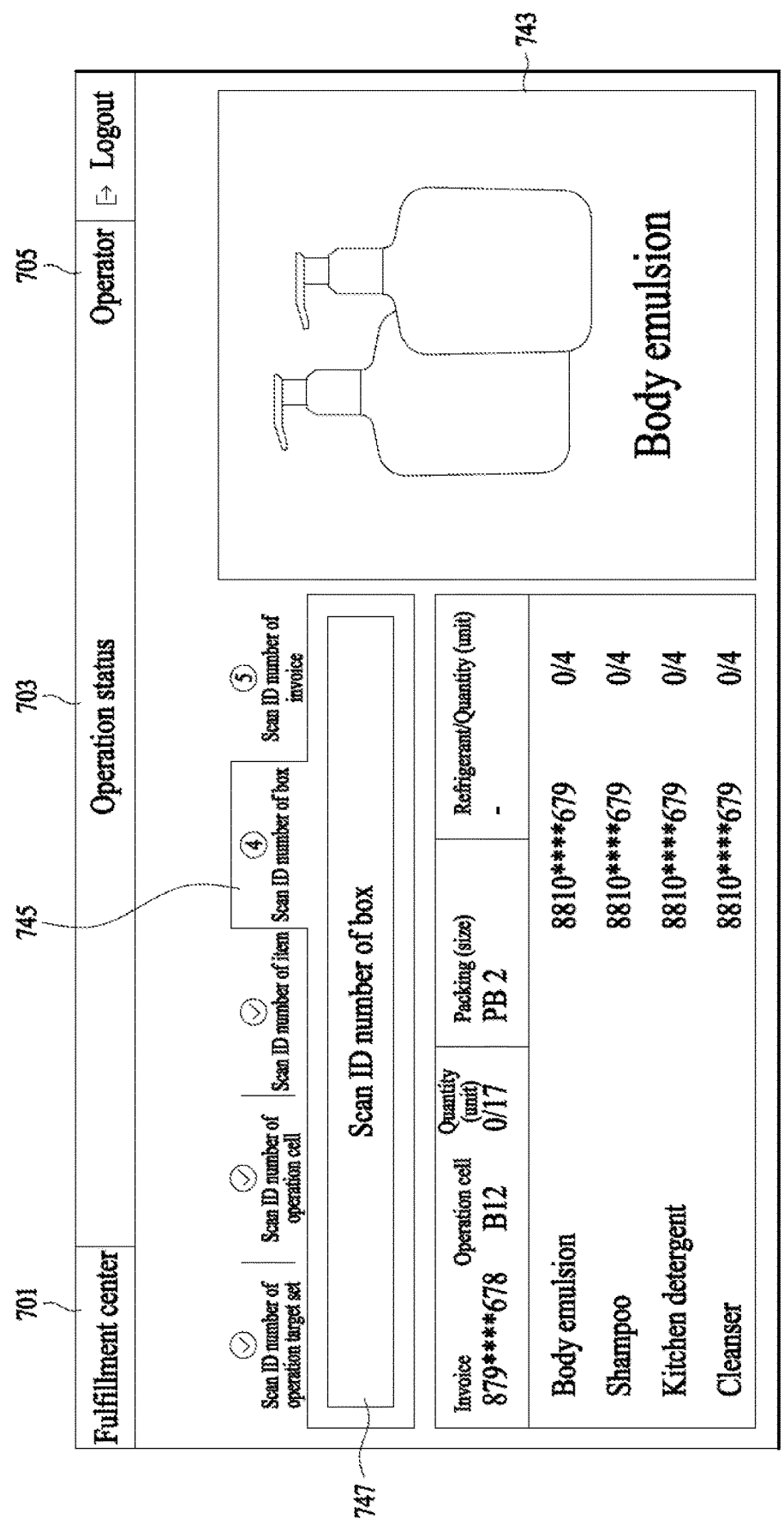
Figure 7H:
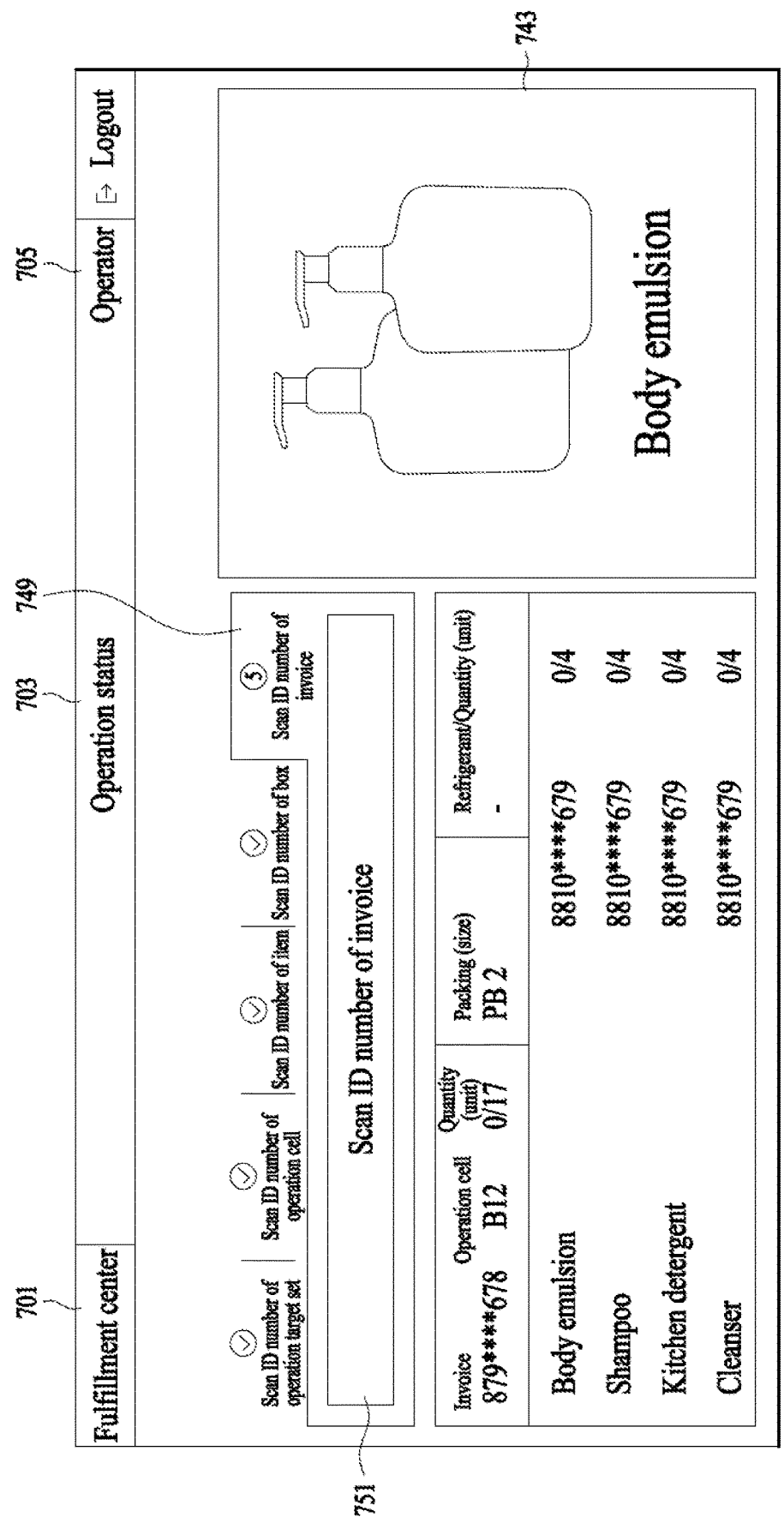

FIG. 7G illustrates a process of scanning a box barcode. When all the items on the item list 741 have been scanned, areas 745 and 747 may be activated. When a box is included in the item list 741 due to packing, the box barcode may be scanned. FIG. 7H illustrates a process of scanning an invoice barcode. When the box barcode is scanned, areas 749 and 751 may be activated so that the invoice barcode can be scanned. When the invoice barcode is scanned, shipment verification and packing may be completed.

Figure 8:
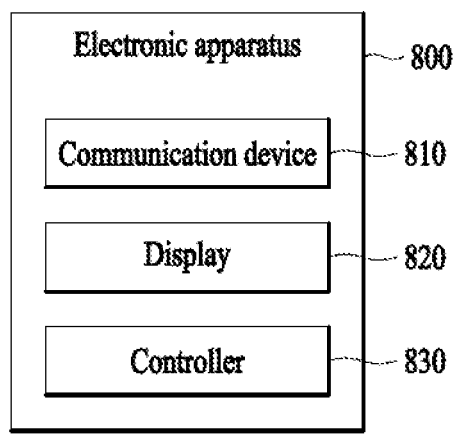
FIG. 8 is a block diagram of an electronic apparatus according to an embodiment.

FIG. 8 is a block diagram of an electronic apparatus according to an embodiment.

An electronic apparatus 800 may include a communication device 810, a display 820, and a controller 820 according to an embodiment. In the electronic apparatus 800 shown in FIG. 8, only elements related to the present embodiment are shown. Accordingly, it may be understood by one of ordinary skill in the art related to the present embodiment that other general-purpose elements may be further included in addition to the elements shown in FIG. 8. Since the description of the above-described electronic apparatus is applicable to the electronic apparatus 800, a repeated description will be omitted.

The communication device 810 is a device for performing wired/wireless communication and may communicate with an external electronic apparatus. The external electronic apparatus may be a terminal or a server. In addition, a communication technology used by the communication device 1030 include Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like. In an embodiment, the communication device 810 may be referred to as a transceiver, and the electronic apparatus 800 may exchange information with an external node through the transceiver.

The display 820 may display information associated with an operation of the electronic apparatus 800. For example, the display 820 may display information associated with an operation cell.

The controller 830 may control overall operations of the electronic apparatus 800 and may process data and signals. The controller 830 may be configured as at least one hardware unit. In addition, the controller 830 may operate by one or more software modules generated by executing program codes stored in the memory. The controller 830 may include a processor and a memory, and the processor may control overall operations of the electronic apparatus 800 and process data and signals by executing program codes stored in the memory. Also, in an embodiment, the controller 830 may include at least one processor.

The controller 830 may identify an operation target set including a plurality of operation cells, and may identify at least one operation cell for which item sorting is completed among the plurality of operation cells. In addition, the controller 830 may select an operation cell based on priority order information. Accordingly, the packing operator may shorten a lead time by performing shipment verification and packing on an operation cell recommended by the electronic apparatus 800, and may complete delivery of a fresh item within a deadline, thereby improving customer reliability.

The electronic apparatus or terminal according to the above-described embodiments may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. Those terms may include software routines in conjunction with processors, etc.

The above-described embodiments are only examples, and other embodiments may be implemented within the scope of the following claims.

What is claimed is:

1. A method operable by an electronic apparatus to determine an optimal packing sequence to pack one or more items inside a plurality of operation cells at a fulfillment center, the method comprising:
    identifying, by the electronic apparatus, a target set of operation cells for packing a plurality of sorted items, wherein the sorted items sorted by a sorting operator at the fulfillment center are disposed at each of the operation cells, wherein the electronic apparatus is configured to communicate with a terminal of the sorting operator and a terminal of a packing operator over a network;
    selecting, by the electronic apparatus, at least one operation cell from the target set for which item sorting has been completed according to a predetermined packing priority; and
    transmitting a first signal to the terminal of the packing operator at the fulfillment center, wherein the first signal is configured to cause information indicative of the selected at least one operation cell to be displayed on the terminal of the packing operator.

2. The method of claim 1, wherein the selecting of the at least one operation cell by the electronic apparatus comprises:
    receiving, by the electronic apparatus from the terminal of the sorting operator, data indicative of completion of the item sorting by the sorting operator; and
    based on the data indicative of the completion of the item sorting, transmitting a second signal to the terminal of the packing operator, wherein the second signal is configured to cause information regarding the at least one operation cell to be displayed on the terminal of the packing operator.

3. The method of claim 1, wherein the predetermined packing priority is determined based on a scheduled shipment date corresponding to each of the at least one operation cell.

4. The method of claim 1, wherein a number of the selected at least one operation cell is determined based on a number of packing operators assigned for the target set.

5. The method of claim 1, wherein the predetermined packing priority is determined based on a time when the item sorting has been completed for each of the at least one operation cell.

6. The method of claim 1, wherein the predetermined packing priority is determined based on a number of items included in each of the at least one operation cell.

7. The method of claim 1, wherein:
    the predetermined packing priority is determined based on a scheduled shipment date corresponding to each of the at least one operation cell,
    in response to the scheduled shipment dates being identical to each other, the predetermined packing priority is determined based on a time when the item sorting for each of the at least one operation cell has been completed, and in response to the times when the item sorting for each of the at least one operation cell has been completed are identical to each other, the predetermined packing priority is determined based on a number of items sorted to each of the at least one operation cell.

8. The method of claim 1, further comprising:
receiving, by the electronic apparatus from the terminal of the packing operator, data indicative of completion of item packing for the at least one operation cell; and
utilizing at least the data indicative of the completion of the item packing for the at least one operation cell for subsequently selecting another operation cell of the target set for packing.

9. The method of claim 1, further comprising:
in response to an input received by the electronic apparatus for identifying another target set of operation cells for packing a plurality of sorted items, determining the another target set identified by a barcode scanner in communication with the electronic apparatus over a network.

10. The method of claim 1, further comprising:
receiving, by the electronic apparatus from the terminal of the packing operator, data indicative of completion of item packing for the at least one operation cell for which the item sorting has been completed; and
based on the data indicative of the completion of the item packing, identifying the at least one operation cell for as an operation cell corresponding to a different delivery information than another operation cell.

11. The method of claim 1, wherein at least one item sorted to an operation cell among the plurality of operation cells has an identical delivery information.

12. A non-transitory computer-readable storage medium having a program stored thereon, which, when executed, causes a computer to execute the method of claim 1.

13. An electronic apparatus for determining an optimal packing sequence to pack one or more items inside a plurality of operation cells at a fulfillment center, comprising:
a communication device; and
a controller configured to:
identify a target set of operation cells for packing a plurality of sorted items, wherein the sorted items sorted by a sorting operator at the fulfillment center are disposed at each of the operation cells, wherein the electronic apparatus is configured to communicate with a terminal of the sorting operator and a terminal of a packing operator over a network via the communication device,
select at least one operation cell from the target set for which item sorting has been completed according to a predetermined packing priority, and
transmit, via the communication device, a signal to the terminal of the packing operator at the fulfillment center, wherein the signal is configured to cause information indicative of the selected at least one operation cell to be displayed on the terminal of the packing operator.

* * * * *